United States Patent
Holden et al.

(10) Patent No.: US 8,356,283 B2
(45) Date of Patent: Jan. 15, 2013

(54) DETERMINING A RELATIVE MEASURE OF FAULT RISK FOR A BUILT SYSTEM

(75) Inventors: Ian Graham Holden, Whiteparish (GB); David Anthony Dalton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1560 days.

(21) Appl. No.: 11/835,472

(22) Filed: Aug. 8, 2007

(65) Prior Publication Data

US 2008/0103797 A1    May 1, 2008

(30) Foreign Application Priority Data

Oct. 27, 2006    (GB) .................................. 0621407.6

(51) Int. Cl.
  *G06F 9/44*        (2006.01)
  *G06F 11/00*       (2006.01)
(52) U.S. Cl. ....... 717/126; 717/122; 717/168; 714/47.1; 714/799
(58) Field of Classification Search ................... 717/126
See application file for complete search history.

(56) References Cited

U.S. PATENT DOCUMENTS

| 5,922,079 | A  | * | 7/1999 | Booth et al. ..................... 714/26 |
| 6,536,036 | B1 | * | 3/2003 | Pavela ........................... 717/125 |
| 6,895,577 | B1 | * | 5/2005 | Noble et al. .................... 717/126 |
| 7,246,271 | B2 | * | 7/2007 | Manley et al. ............... 714/47.3 |
| 7,617,415 | B1 | * | 11/2009 | Kadakia ......................... 714/26 |
| 7,747,987 | B1 | * | 6/2010 | Akarte et al. ................. 717/131 |
| 2006/0184838 | A1 | * | 8/2006 | Singonahalli et al. .......... 714/45 |

OTHER PUBLICATIONS

Broadie, Mark; Du, Yiping; Moallemi, Ciamac C.;, "Risk estimation via weighted regression," Simulation Conference (WSC), Proceedings of the 2011 Winter , vol., no., pp. 3854-3865, Dec. 11-14, 2011, doi: 10.1109/WSC.2011.6148077.*

* cited by examiner

*Primary Examiner* — James D Rutten
(74) *Attorney, Agent, or Firm* — Patents on Demand P.A.; Brian K. Buchheit; Scott M. Garrett

(57) ABSTRACT

The present invention discloses a method, apparatus and software for determining a relative measure of the risk of faults in a built product relative to a reference build of the product. The measure can be based on a balance between the additional risk added as a result of changes made in a given build and the risk reduction resulting from testing applied to the build. The product associated with the builds can be a software product, a firmware product, an electronic device, and/or any manufactured product.

19 Claims, 4 Drawing Sheets

DETERMINING A RELATIVE MEASURE OF FAULT RISK FOR A BUILT SYSTEM

CROSS-REFERENCE TO RELATED APPLICATIONS

This application claims the benefit of British Patent Application No. 0621407.6 filed 27 Oct. 2006 and which is hereby incorporated by reference.

BACKGROUND

1. Field of the Invention

The present invention relates to the field of software and/or device testing and development and, more specifically, to determining a relative measure of fault risk for a built system.

2. Description of the Related Art

Many products are produced in successive builds or versions, with each build or version comprising modifications or improvements to the previous build. Testing of such built products commonly involves applying a set of one or more test cases to the product. The primary risk of faults in a new product release is defects that have not been found by the testing performed. This is due to the testing process failing to cover faults introduced in the engineering of the new build or pre-existing faults that had remained undetected. In order to remove this risk, a testing system is needed that is capable of determining whether substantially all faults had been identified. Such absolute testing systems are complex and expensive, especially where more sophisticated built products are considered.

SUMMARY OF TH INVENTION

The present invention discloses a method, apparatus and software for determining a relative measure of the risk of faults in a built product relative to a reference build of the product. The measure can be based on a balance between the additional risk added as a result of changes made in a given build and the risk reduction resulting from testing applied to the build. The product associated with the builds can be a software product, a firmware product, an electronic device, and/or any manufactured product.

The present invention can be implemented in accordance with numerous aspects consistent with the material presented herein. For example, one aspect of the present invention can include a method for determining a relative fault risk measure for a build of a built system comprising a set of build elements. In the method, a reference build of a built system can be identified. A base value can be assigned for a fault risk measure for the built system. A risk weight can be assigned to each build element in the built system. A set of build elements can be identified that have been changed in a further build of the built system. A set of test cases can be applied to the further build. A subset of the changed build elements that have been tested can be identified. A risk increase factor can be calculated based on the sum of said risk weights of each build element that has been changed and not tested. A risk reduction factor can be calculated based on a sum of the risk weights of each build element that has been changed and tested. The fault risk measure can be updated by mathematically compensating for the risk increase factor the risk reduction factor.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
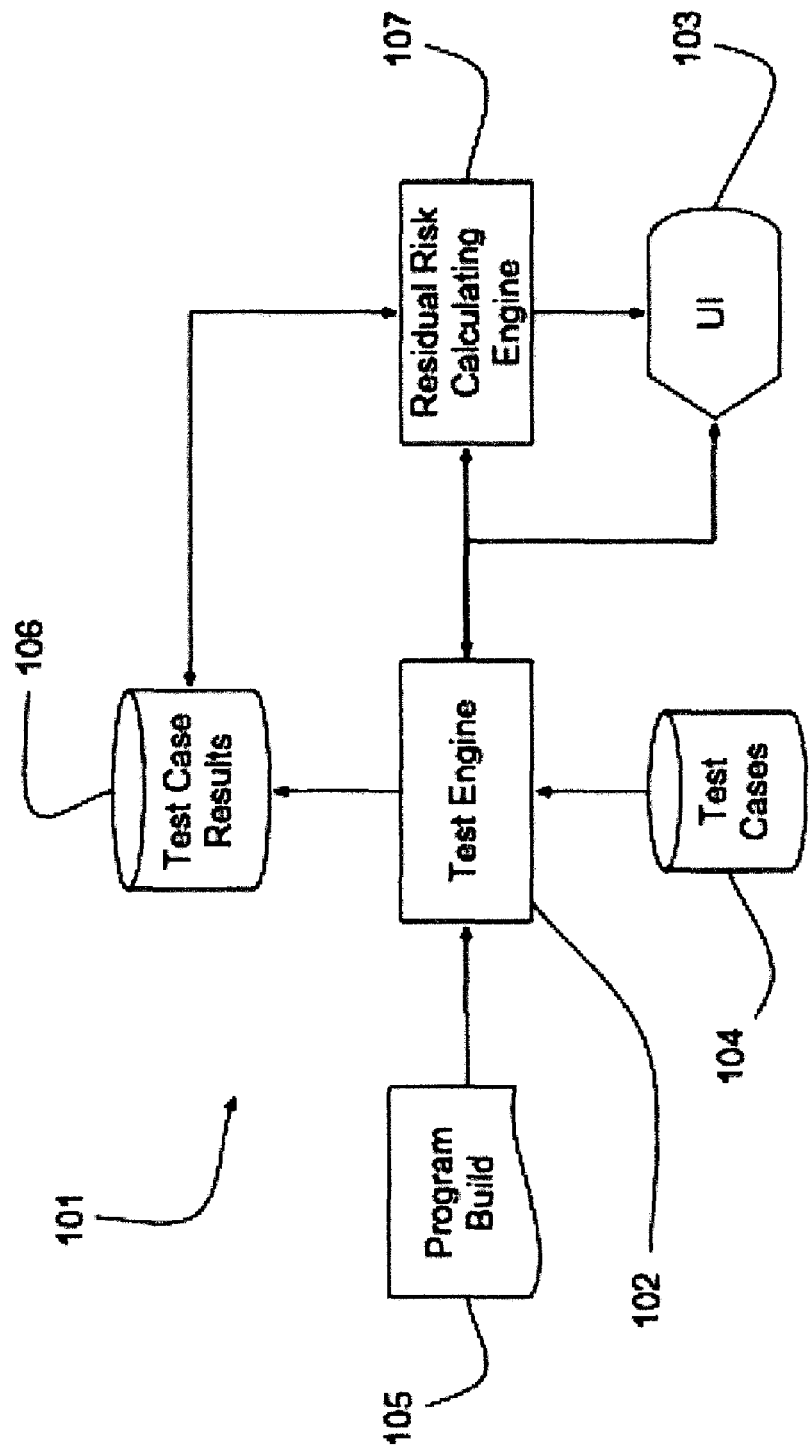
FIG. 1 is a schematic illustration of a product testing system able to measure fault risk in accordance with an embodiment of the inventive arrangements disclosed herein.

With reference to FIG. 1, a product testing environment in the form of a software application program testing environment 101, provided by a test management and execution application program, comprises a test engine 102 connected to a user interface (UI) 103. The test engine 102 is arranged to apply a set of stored test cases 104 to each of a series of product builds in the form of program builds 105 of a built product in the form of a software system. Each build of the software system comprises a set of software elements in the form of classes or other software objects. The test engine 102 produces and stores test case results 106 for each test case 104 applied for each of the series of builds 105. After a number of testing iterations, the test case results 106 provide a history of the testing of each test case against each build of the software system. The test engine 102 is controlled by a user via the UI 103 which is also used to view the test case results 106.

The test management and execution application program further comprises a relative residual risk engine (RRRE) 107, which is triggered when a new program build 105 is supplied to the test engine 102 for testing. In response to the new program build, the RRRE 107 is arranged to produce a relative measure of the fault risk of a fault being present in the new build. This risk measure is a relative measure created from an analysis of the new build relative to a previously processed reference build which acts as a benchmark for the relative risk measure. When analyzing the reference build, the risk measure is set to a start value and a record made of all of the build elements, in the form of code classes present in the reference build, and which of those classes have been tested.

When the new build is created, the RRRE 107 is arranged to analyze the new build and identify any changes that have been made to the program by way of modification or addition of code classes and to establish which of the new or modified code classes have been subsequently tested by the test engine 102. If the RRRE 107 identifies any modified or added code classes, the risk measure is increased for that build. Conversely, for each of those added or modified classes that are then tested, the risk measure is decreased. Similarly, if any unchanged and previously untested code classes have either been removed or have been retained and tested this further contributes to the reduction of the risk measure. The relative residual risk (RRR) measure is displayed to the user via the UI 103.

In order to perform this analysis, the RRRE 107 maintains records of the classes that fall into the following sets:
- The set H of any classes that have been changed or added in builds since the reference build;
- The set TB of any classes in the reference build that could be tested by the test cases 104;
- The set T of any classes that have been tested in builds since the reference build;
- The set DH of classes changed or added to the latest build;
- The set RH of classes that have been removed from the latest build; and
- The set DT of classes that have been tested in the latest build.

As noted above, when the reference build is analyzed, the risk value is set to a start value, which in the present embodiment is 1. Since there are no changed classes and no testing has been performed the sets H and T are empty. From this point on, the relative risk measure is increased in accordance with a factor based on the changed classes H and decreased in accordance with a factor based on the tested classes T.

In the present embodiment, the sets H and T are updated for each build iteration both before and after testing of a build. Prior to testing, the set of all changes H is updated to include any classes that have been added or changed in the new build, that is set DH, and to remove any classes that have been removed from the current build, that is set RH. These pre-testing updates are defined as follows:

$H = (H \cup DH) - RH$ $T = T - DH - RH$

After the testing of the build, the effects of the testing are recorded. In other words, the set of all tested classes T is updated with the set of classes that have been tested in the latest build, that is set DT, and also any classes deleted as a result of testing, that is set RH. These post-testing updates are defined as follows:

$T = T \cup DT - RH$

In the present embodiment, each code class in the reference build and any subsequent build is assigned a risk weight. The risk weight is a manually determined measure of the likelihood and significance of a fault occurring in a particular class. In other words, it is a measure of the impact on the software system of a fault being identified in a given code class. The risk weights are assigned to each class in the reference build and to each subsequently added class. In the present embodiment, the running weights are stored in a lookup table and indexed by a unique identifier for each class in the form of the class name. The risk weighting of each class provides a mechanism for comparing the importance of each class in terms of testing. For example, a critical class known to be problematic may be given a higher weighting than a simple interface class.

The calculation of the pre-testing or post-testing changes to the risk measure are arranged to take into account the risk weights of the classes that contribute to the relevant change in proportion to a base weighting. In the present embodiment, the base weighting is a further manually determined measure of the expected risk contributed by all of the changes to a given build (hx).

The pre-testing risk increase factor r applied to the risk measure (RRR) is calculated as follows:

$$r = \frac{\sum_{C \in H} f(C)}{hx}$$

Where the function $f(C)$ represents the lookup table that stores the risk weight for each class C. Thus, the risk measure (RRR) before testing a given build is defined as:

pre-testing $RRR = 100(1+r)\%$

After testing each build, a reduction in the risk measure (RRR) is calculated based on the testing performed. As noted above, the set DT of classes tested in the latest build are incorporated in the set T of all tested classes and any deleted tested classes are removed ($T = T \cup DT - RH$). Thus the reduction in the risk measure can be calculated from the risk weights of each class that has been changed and tested, the risk weights of each previously untested class included and tested in the current build and the risk weights of each previously untested class omitted from the current build. This set excludes the results of any testing which has no effect on the risk measure (RRR) such as testing of previously tested classes. In other words, the risk reduction factor is focused on the testing necessary to reduce the risk measure (RRR). These classes can be defined as follows:

$T = T - (TB - H)$

The post-testing decrease to the risk measure (RRR) or risk reduction factor t is calculated as follows:

$$t = \frac{\sum_{C \in (T - (TB - H))} f(C)}{hx}$$

Thus the risk measure (RRR) calculated after testing is defined as follows:

Post-testing $RRR = 100(1+r-t)\%$

Figure 2:
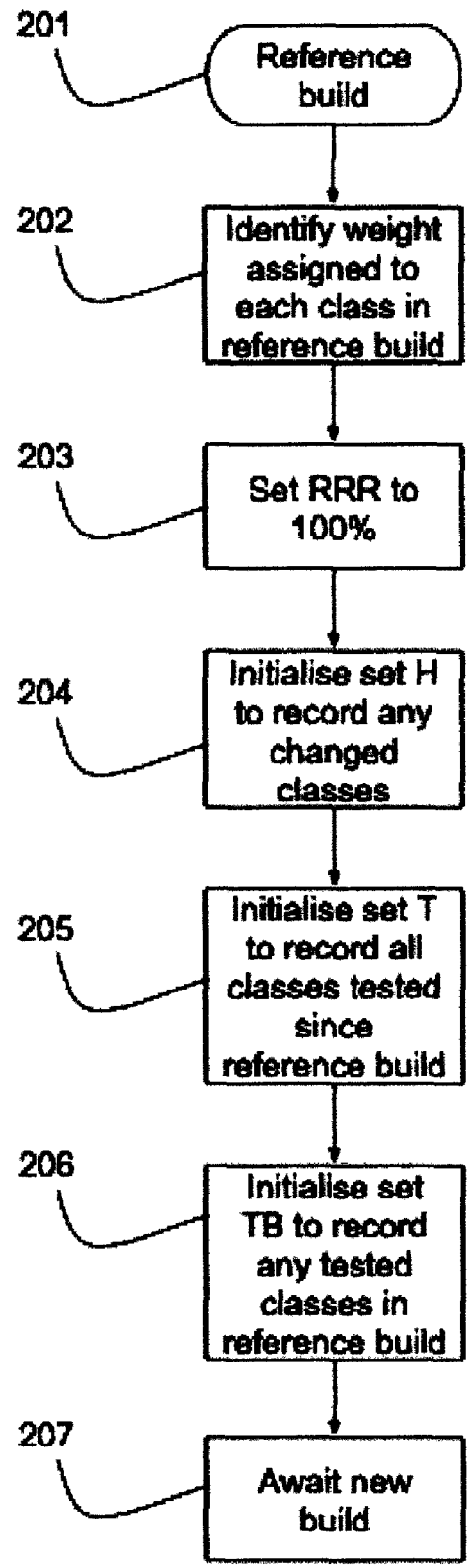
FIG. 2 is a flow chart of a method to measure fault risk during product testing in accordance with an embodiment of the inventive arrangements disclosed herein.

The processing carried out by the by the RRRE 107 when initializing the RRR measure for a selected reference build will now be described further with reference to the flow chart of FIG. 2. At step 201, processing is initiated by a user via the UI 103. The user selects a build of the software program as the reference build and processing moves to step 202. At step 202, the user is prompted to enter risk weights for each class in the reference build that does not already have an associated risk weight. The entered risk weights are added to the lookup table containing the risk weights for all the classes in the reference build. Processing then moves to step 203 where the base value of the RRR measure is set to 1 (or 100%) and processing moves to step 204. At step 204, the set H of all changed or added classes is initialized as an empty set. Processing then moves to step 205 where the set T of all classes tested subsequent to the reference build is initialized as an empty set. Processing then moves to step 206 where all the classes in the reference build that have been tested are identified and placed in the set TB. Processing then moves to step 207 to await a further build of the software system.

Figure 3:
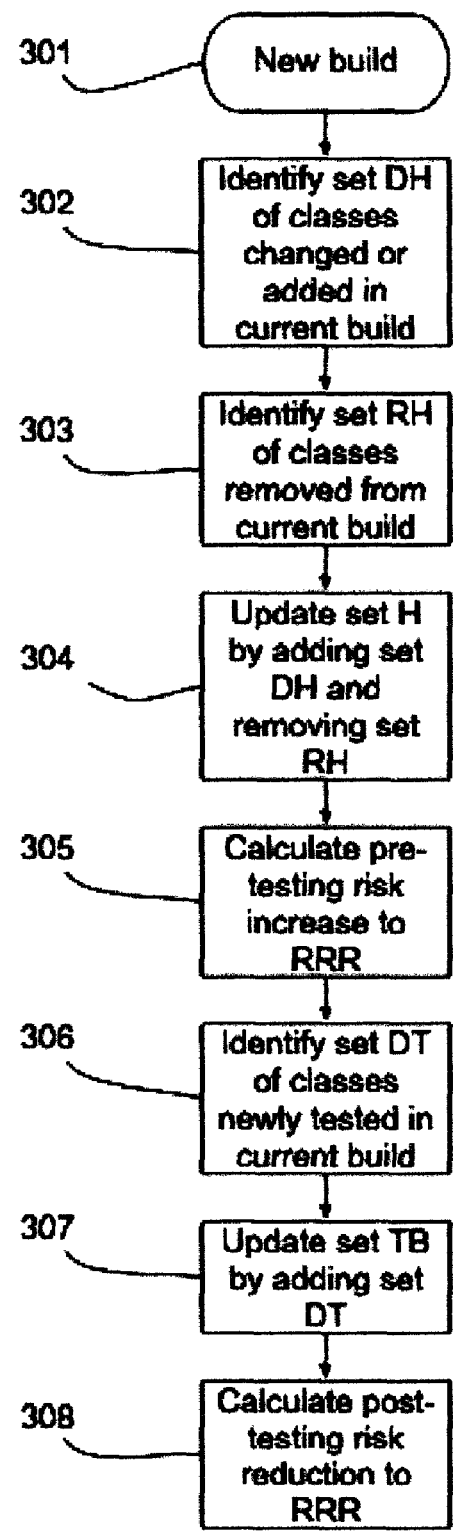
FIG. 3 is a flow chart of another method to measure fault risk during product testing in accordance with an embodiment of the inventive arrangements disclosed herein.

The processing by the RRRE 107 of each further build subsequent to the reference build will now be described in further detail with reference to the flow chart of FIG. 3. At step 301, the RRRE 107 detects the production of a further build and processing moves to step 302. At step 302, the set DH of classes that have been newly added or that have been changed is identified and stored. If any newly added classes are detected and there is no corresponding entry in the lookup table of risk weights, then the user is prompted to enter an appropriate risk weight for each new class, which is then stored in the lookup table. Processing then moves to step 303 where the set RH of classes removed from the current build is identified and stored. Processing then moves to step 304, where the set H of all changed classes is updated to take into account the new changed classes defined by set DH and the removed (changed) classes defined by set RH. Processing then moves to step 305 where the risk increase factor r is calculated and applied to the current value of the RRR measure resulting in the pre-testing RRR measure as described above. The pretesting RRR measure is displayed via the UI 103 and the risk increase factor r is stored for later use.

Processing then moves to step 306 where the set DT of classes tested in the current build is identified once testing is complete. Processing then moves to step 307 where the set T of all classes tested since the reference build is updated to include the members of set DT. Processing then moves to step 308 where the risk reduction factor r is calculated and applied to the pre-testing value of the RRR measure resulting in the post testing RRR measure as described above. The post-testing RRR measure is displayed via the UI 103 and stored for use in the next build of the software system.

Figure 4A:
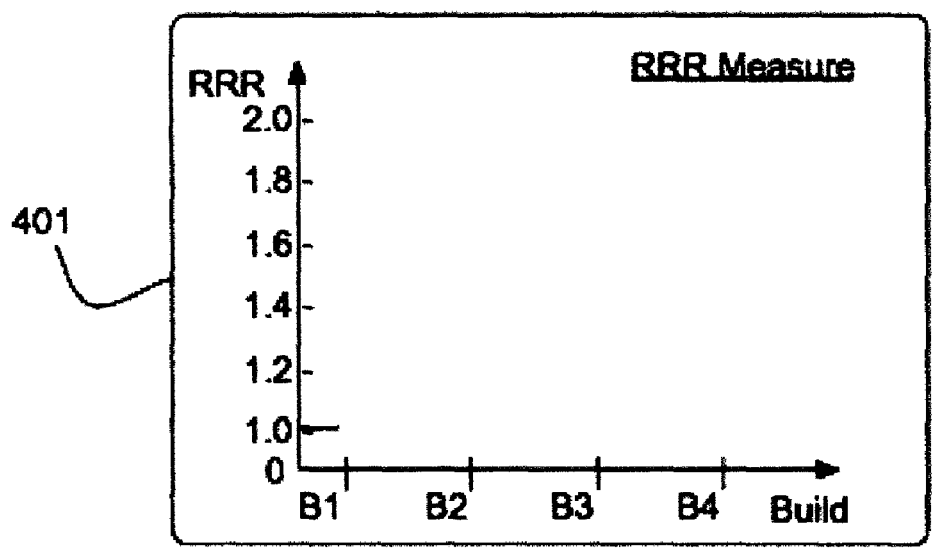
FIGS. 4a and 4b are schematic illustrations of the output produced by a testing system able to assess fault risk in accordance with an embodiment of the inventive arrangements disclosed herein.
Figure 4B:
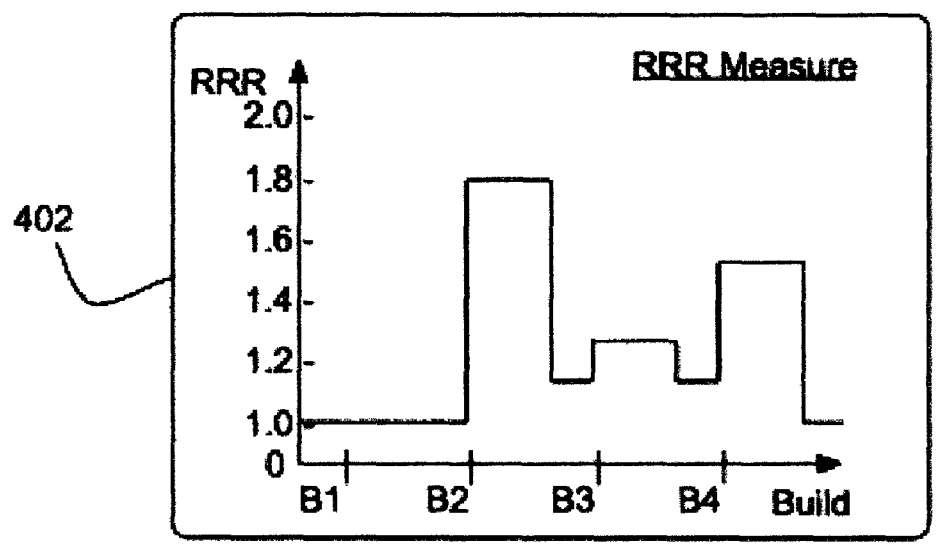

FIG. 4a shows a display window 401 that forms part of the user interface 103. The display window 401 displays a graph of the RRR measure with the build index on the x-axis and the RRR values on the y-axis. The reference build is designated as build B1 and the graph of FIG. 4a shows the pre-testing RRR measure value as 1.0 or 100% as described above. FIG. 4b shows the graph after three further builds and, therefore, three updates of the RRR measure. The RRR measure rises to 1.8 or 180% prior to the first further build B2 being tested but is reduced to 1.2 after testing. The RRR measure then rises to 1.3 prior to the second further build B3 being tested and is reduced again to 1.2 after testing of that build. The RRR measure then rises to 1.5 prior to the third further build B4 being tested and is reduced to its original base value of 1.0 after testing of that build. In summary, the graph illustrates to the users or developers of the software system that although the further builds B2 to B4 introduced significant changes thus raising the RRR measure, the testing employed on each build succeeded in reducing the potential effects of those introduced changes and thus reduced the risk of errors being present and thus discovered in the released product. Furthermore, by the time the third further build B4 was tested and thus released, the relative residual risk (RRR) of faults in the product had been brought back to the level of the reference build. In other words, sufficient changed or added classes had been tested, or untested classes had been removed to balance out all of the changed or added classes not covered by tests.

In another embodiment, the RRR measure is updated by the risk increase and decrease factors only after testing. In a further embodiment, the post-testing RRR measure is calculated during the testing of any given build. This is achieved by performing steps 306 to 308 after each individual test is completed or at predetermined intervals.

In another embodiment, the testing is targeted so as to reduce the RRR measure. This is achieved by identifying tests which cover classes that remain untested from prior builds that have been newly changed or added in the current build but remain untested. This target set is defined by set H−T, and enables an ideal list of test suites to be identified. In a further embodiment, rather than the risk reduction factor discounting the effect of any testing that does not effect newly added, changed or as yet untested classes as described above, no account is taken of such unnecessary testing. In other words, the risk reduction factor takes into account the risk weights of any tested or removed class.

In another embodiment, a universal set A is maintained that comprises a running list of all of the classes in the reference build and subsequent builds. The set A is updated prior to testing by adding set DH and removing set RH. The sum of all of the risk weights of the classes in set A is then used as the base weighting, in place of hx as described above, for calculating the risk increase and decrease factors r and t. As the set A is updated, the value of the sum of the risk weights is correspondingly modified. This results in an RRR measure, which is charted relative to the risk weights assigned to the product as a whole. Thus, when the amount of changes in a build are small, the change in the RRR measure is correspondingly small.

In a further embodiment, the sum of all of the risk weights of the classes in set H is used as the base weighting, in place of hx as described above, for calculating the risk increase and decrease factors r and t. As the set H is updated, the value of the sum of the risk weights is correspondingly modified. This results in an RRR measure which is charted relative to the risk weights assigned to only the changed classes. In absolute terms, the scale of the RRR measure varies with time.

In another embodiment, a logarithmic scale is used for the RRR measure so as to make smaller changes in the RRR measure more visible.

In a further embodiment, the risk reduction factor t is modified to reflect the measured or perceived effectiveness of the testing carried out on the build. In other words, the less effective the testing the smaller the respective reduction to the post-testing RRR measure. This may be achieved by introducing a testing effectiveness coefficient te to the calculation of the risk reduction factor as follows:

$$\text{Post-testing } RRR = 100(1 + r - te \cdot t)\%$$

The testing efficiency may be based on the testing for a given build or may be the mean testing efficiency mte of testing over a series of builds such as all build since the reference build.

As will be understood by those skilled in the art, while the embodiments described above relate to the calculation of an RRR measure for a software system, this software system may be substituted for any other system or article which undergoes repeated builds or versions and whose performance is then tested against a set of test cases. Such articles may include complex articles such as computer equipment, aircraft or spacecraft or simpler articles such as buildings, mechanical tools or furniture. In summary any manufactured article or system could be tested under this regime using the described RRR measure.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for determining a relative fault risk measure for a build of a built system comprising a set of build elements, said method comprising the steps of:
   identifying, by a computing device, a reference build of a built system;
   assigning, by the computing device, a base value to a fault risk measure for said built system;
   assigning, by the computing device, a risk weight to each build element in said built system;
   identifying, by the computing device, the set of build elements that have been changed in a further build of said built system;
   applying, by the computing device, a set of test cases to said further build;
   identifying, by the computing device, the subset of said set of changed build elements that have been tested;
   calculating, by the computing device, a risk increase factor based on the sum of said risk weights of each build element that has been changed and not tested;
   calculating, by the computing device, a risk reduction factor based on the sum of said risk weights of each build element that has been changed and tested; and
   updating, by the computing device, said fault risk measure by including said risk increase factor and removing said risk reduction factor.

2. The method of claim 1, wherein said risk increase factor is based on the sum of said risk weights of each build element that has been changed or added and not tested.

3. The method of claim 1, wherein said risk reduction factor is based on the sum of said risk weights of each build element that has been changed and tested, said risk weights of each previously untested build element included and tested in the current build, and said risk weights of each previously untested build element omitted from said further build.

4. The method of claim 1, wherein said fault risk measure is calculated for each in a series of said further builds of said built system.

5. The method of claim 1, wherein said fault risk measure is displayed relative to said base value.

6. The method of claim 1, wherein said fault risk measure is stored for display prior to said testing of said further build risk measure and updated by only said risk increase factor.

7. The method of claim 1, wherein said risk weight is a relative measure of the likelihood and significance of a fault in a given build element.

8. The method of claim 1, wherein said risk reduction factor and said risk increase factor are calculated from the sum of the respective risk weights in proportion to a base weighting.

9. The method of claim 8, wherein said base weighting is a measure of the total risk for all changes in said further build.

10. The method of claim 8, wherein said base weighting is the sum of the risk weights for all build elements comprised in said further build.

11. The method of claim 8, wherein said base weighting is the sum of the risk weights for all of the changed or added build elements in said further build.

12. The method of claim 1, wherein said built system is a software system and said build elements are software elements.

13. The method of claim 1, wherein said steps of claim 1 are steps performed automatically by at least one machine in accordance with at least one computer program having a plurality of code sections that are executable by the at least one machine, said at least one computer program being stored in a machine readable medium.

14. An apparatus for determining a relative fault risk measure for a build of a built system comprising a set of build elements, said apparatus comprising at least one processor and memory, said apparatus being operable to:
   identify a reference build of a built system;
   assign a base value to a fault risk measure for said built system; assign a risk weight to each build element in said built system;
   identify the set of build elements that have been changed in a further build of said built system;
   apply a set of test cases to said further build;
   identify the subset of said set of changed build elements that have been tested;
   calculate a risk increase factor based on the sum of said risk weights of each build element that has been changed and not tested;
   calculate a risk reduction factor based on the sum of said risk weights of each build element that has been changed and tested; and
   update said fault risk measure by including said risk increase factor and removing said risk reduction factor.

15. The apparatus of claim 14, wherein each risk weight is a relative measure of a likelihood and significance of a fault in a given build element.

16. The apparatus of claim 14, wherein said risk reduction factor and said risk increase factor are calculated from the sum of the respective risk weights in proportion to a base weighting.

17. A set of machine readable instructions stored on a machine readable non-transitory medium causing at least one machine to perform a set of steps comprising:
   identifying a reference build of a built system;
   assigning a base value to a fault risk measure for said built system;
   assigning a risk weight to each build element in said built system;
   identifying the set of build elements that have been changed in a further build of said built system;
   applying a set of test cases to said further build;
   identifying the subset of said set of changed build elements that have been tested;
   calculating a risk increase factor based on the sum of said risk weights of each build element that has been changed and not tested;
   calculating a risk reduction factor based on the sum of said risk weights of each build element that has been changed and tested; and
   updating said fault risk measure by including said risk increase factor and removing said risk reduction factor.

18. The set of machine readable instructions of claim 17, wherein said risk reduction factor is based on the sum of said risk weights of each build element that has been changed and tested, said risk weights of each previously untested build element included and tested in the current build, and said risk weights of each previously untested build element omitted from said further build.

19. The set of machine readable instructions of claim 17, wherein said risk reduction factor and said risk increase factor are calculated from the sum of the respective risk weights in proportion to a base weighting.

* * * * *